United States Patent [19]

Lainé et al.

[11] Patent Number: 4,853,935
[45] Date of Patent: Aug. 1, 1989

[54] FREQUENCY STABILIZATION OF GAS LASERS

[75] Inventors: Derek C. Lainé, Keele, England; Mohammad I. A. Taha, Abu Deis, Israel

[73] Assignee: University of Keele, Keele, England

[21] Appl. No.: 235,062

[22] Filed: Aug. 22, 1988

[30] Foreign Application Priority Data

Aug. 25, 1987 [GB] United Kingdom ............. 8720022

[51] Int. Cl.$^4$ .............................................. H01S 3/13
[52] U.S. Cl. ...................................... 372/32; 372/28; 372/4; 372/59
[58] Field of Search .................. 372/32, 28, 20, 33, 372/4, 5, 9, 26, 60

[56] References Cited

U.S. PATENT DOCUMENTS

| 3,566,304 | 2/1971 | Neusel et al. | 372/59 |
| 4,434,490 | 2/1984 | Kavaya et al. | 372/32 |
| 4,538,635 | 9/1985 | Laderman et al. | 372/58 |

Primary Examiner—Léon Scott, Jr.

[57] ABSTRACT

A gas laser 10 has a gas-field enclosure 12 in which electrodes 14, 16 are operable to excite the gas within the enclosure to emit laser radiation. The region 20 between the electrodes 14, 16 contains a plasma which emits the laser radiation. At one end of the enclosure 12, there is a plasma-free region 22 undivided from the region 20. A microphone 24 is located in the plasma-free region 22. This detects pressure waves occurring in the plasma-free region when laser radiation is absorbed. The signal from the microphone is used to control a feedback circuit 26 to stabilize the frequency of the emitted laser radiation.

19 Claims, 1 Drawing Sheet

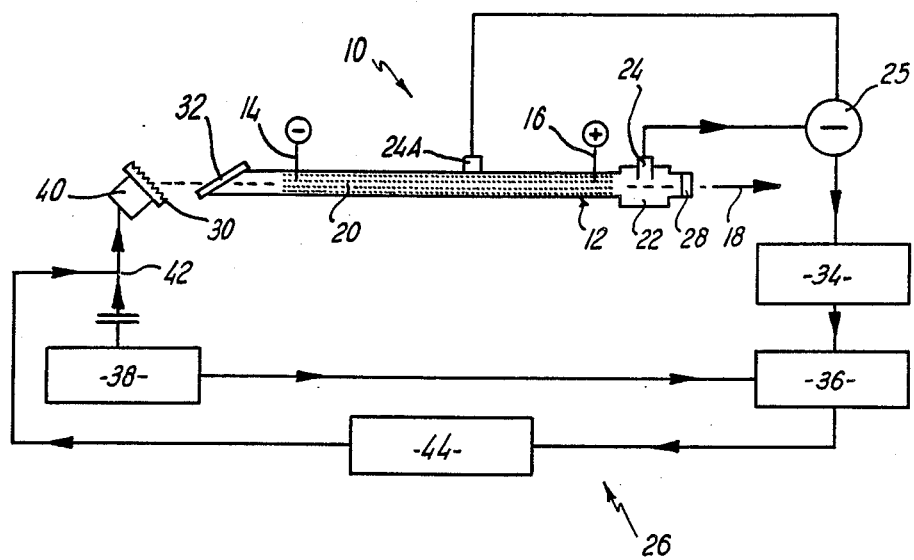

FREQUENCY STABILIZATION OF GAS LASERS

FIELD OF THE INVENTION

The present invention relates to the frequency stabilization of gas lasers and in particular but not exclusively to carbon dioxide lasers operating in the infrared spectral region (9–11 μm).

BACKGROUND OF THE INVENTION

Previous proposals for frequency control include gas absorption cell techniques using a cell generally (but not always) outside the laser cavity. Operation of the cell at low pressures permits frequency stabilization based on the measurement of a variety of phenomena including Doppler broadened lines (for instance in $CO_2$, $OsO_4$, $NH_3$, $SF_6$, etc.), or super-narrow lines based on Lamb-dip methods. Detection can be effected by monitoring the reduction of transmitted power, using direct power detection, or by laser fluorescence methods which lock to the peak of the power curve by monitoring a portion of the frequency-modulated output power. Laser opto-acoustic methods have also been proposed and used.

Other methods previously proposed are sensitive to the laser frequency. An example is the optogalvanic method in which current changes are measured. This current change is a fuction of the plasma tube impedance, which in turn varies with laser frequency. A related method detects changes of plasma tube impedance by measuring the electric field outside and close to the laser tube. These methods are relatively simple to implement because the detection apparatus (but not the phenomenon) is outside the laser tube. However, the plasma discharge is maintained by a large dc current and fluctuations within the plasma generate electrical noise which is recorded by the detecting apparatus. If frequency modulation of the laser cavity length is used (as is usual) a large frequency swing is required to give a satisfactory level of signal to noise in the detected signals and this modulation in turn leads to spectral broadening of the laser output. Furthermore, harmonics of the mains electrical supply can be a significant contribution to the noise.

The extension of optogalvanic methods to radio-frequency-excited lasers has been made, but is poor in signal to noise ratio because of the high level of plasma discharge noise which then occurs.

The present invention seeks to address these problems and to provide an alternative arrangement for frequency stabilization.

SUMMARY OF THE INVENTION

According to the present invention there is provided a gas laser comprising a gas-filled enclosure and excitation means operable to excite gas within the enclosure to emit laser radiation, the enclosure having, in use, a first region containing a plasma excited by the excitation means and a second substantially plasma-free region, and the laser further comprising pressure sensing means located in the said second region for detecting pressure changes associated with absorption of the laser radiation by the gas within the second region, and feedback means operative in response to the output of the pressure sensing means to control the frequency of the emitted laser radiation.

Preferably the pressure sensing means is a microphone. The microphone may comprise a diaphragm which flexes in response to changes in pressure, there being provided means for equalising pressure on each face of the diaphragm, whereby damage to the diaphragm during us is averted.

The laser may further comprise vibration sensing means responsive to vibrations generated within or outside the enclosure independently of the absorption of radiation within the second region, the feedback means being responsive to a signal from the vibration sensing means to subtract from the output of the pressure sensing means that part of the said output, which is caused by the said vibrations. The vibration sensing means may comprise a second microphone.

Preferably the feedback means controls the path length of the laser radiation between two reflecting means. The path length may be controlled by moving one of the reflecting means. The movable reflecting means may be mounted on a piezo crystal to which a signal is applied by the feedback means. One of the reflecting means may comprise a mirror. The other reflecting means may comprise a grating. The path length is preferably set by moving the grating. The grating is preferably acoustically decoupled from the gas within the enclosure. The grating is preferably located outside the enclosure.

The second region may comprise a Stark cell, the laser further comprising means for modulating the absorption frequency or line width of gas within the Stark cell.

Preferably the feedback means comprises amplifying means which amplifies the output of the pressure sensing means for generating a signal for use in controlling the laser frequency. The amplifying means may provide a dc control signal. The feedback means may further provide an ac modulation signal by means of which the laser frequency is continuously varied. The ac modulation signal and the dc control signal are preferably combined before being used to control the laser frequency.

The gas within the cavity may comprise a trace gas in addition to a laser gas, wherein the trace gas can absorb laser radiation produced by the laser gas. The trace gas preferably has an absorption line which starts from the ground state of the trace gas and which is substantially coincident with the laser radiation frequency. The laser medium is preferably carbon dioxide. The trace gas may comprise ethylene, sulphur hexafluoride, ammonia or osmium tetroxide etc. The laser radiation frequency is preferably in the infrared region.

BRIEF DESCRIPTION OF THE DRAWING

One embodiment of the present invention will now be described in more detail, by way of example only, and with reference to the accompanying schematic diagram of a gas laser incorporating a frequency stabilization system which embodies the present invention.

DESCRIPTION OF THE PREFERRED EMBODIMENT

The diagram shows a gas laser 10 comprising a gas-filled enclosure 12 and excitation means 14, 16 operable to excite gas within the enclosure to emit laser radiation, indicated at 18. The enclosure 12 has, in use, a first region 20 containing a plasma excited by the excitation means 14, 16, and a second substantially plasma-free region 22. The laser 10 further comprises pressure sensing means 24 in the form of a microphone located in the plasma-free region 22 for detecting pressure changes associated with absorption of the laser radiation by the gas within the region 22. Feedback means 26 is operative in response to the output on the microphone 24 to control the frequency of the emitted laser radiation.

In more detail, the enclosure 12 is a tube filled with a gas suitable for use as a laser medium. This may be carbon dioxide. The excitation means 14, 16 are electrodes between which a dc discharge can be established. This generates a plasma within the region 20 between the electrodes 14, 16. The plasma generates laser radiation which is amplified following reflection off a partially-reflecting mirror 28 and a grating 30. The radiation leaves enclosure 12 through a Brewster window 32 for reflection by the grating 30 and the final output 18 of the laser 10 leaves through the mirror 28. It can be seen from the diagram that both electrodes 14, 16 are spaced from their respective ends of the enclosure 12 and consequently, there exists at each end of the enclosure a region which is undivided from the region 20, but in which there is no plasma. The plasma-free region 22 between the electrode 16 and the mirror 28 is an example. The microphone 24 is mounted within the region 22 to detect pressure waves within that region and to convert such waves to an electrical signal which is supplied to an amplifier/integrator circuit 34 and then to a lock-in amplifier 36. The lock-in amplifier also receives a reference frequency from a modulator 38. This reference frequency is also applied as an ac modulation to the piezo crystal 40 on which the grating 30 is mounted. This causes the grating to move to change the path length of the laser radiation between the grating 30 and the mirror 28 and this in turn changes the frequency of the radiation 18.

When the laser frequency is stabilized, the ac modulation results in the frequency oscillating slightly (dithering) around the frequency which yields the maximum output strength from the particular gas within the enclosure 12. Any variation between this peak frequency and the centre frequency of the laser output caused by the dither is detected by the feedback means 26 as will be described and gives rise to a dc control signal which is superimposed at 42 on the ac signal. This introduces a stabilizing bias into the path length between the grating 30 and mirror 28.

In operation, the laser tube is electrically excited in the normal way by the dc discharge between the electrodes 14, 16. In the plasma-free regions at the end of the discharge tube, where the gas is cooler than in the central plasma region 20, the gas remains slightly absorptive at the natural resonance frequency of the laser gas medium. This is because there is a small population in the lower energy state of the laser transition (so long as this level is not too far above the ground state). The laser radiation passing through the enclosure 12 also passes through the plasma-free region 22 and a small fraction of the radiation will be absorbed in the region 22. This absorption causes a pressure wave as the gas in the region 22 expands and the pressure wave is detected by the microphone 24. Thus, the laser emission within the first region 20 results in an output from the microphone, via an optical and acoustic (or optoacoustic) coupling between the region 20 and the microphone. This method of generating pressure waves in the region 22 is highly sensitive. Only a small percentage of the full laser power is absorbed in this way. Moreover, since the process is taking place within the laser cavity 12 and using the laser medium, a large input power is involved in the process. For instance, in a 40 watt laser with 80% reflecting mirrors, about 200 watts are involved in the optoacoustic process.

The output of the microphone 24 is used to modulate the ac signal from the modulator 38, as has been described. The microphone signal is detected by the lock-in amplifier 36 and then amplified by a high voltage dc amplifier 44. The laser is therefore frequency-locked to the peaks of the same gas absorption resonance which are involved in the laser action in the region 20.

The lower laser level has a low occupancy of molecules in the region 22 because it is significantly higher in energy than the ground state. Nevertheless, strong signal is produced from the microphone 24 because of the great sensitivity of the optoacoustic method described and the high level of power which contributes to the process. Signal-to-noise levels have been found to be good. Unlike the optogalvanic methods described above, in which large signal fluctuations occur even when no laser oscillation is occuring, the optoacoustic noise background is very low in the absence of laser oscillation because it is only the optoacoustic signal in the locality of the microphone which is detected. Some noise will inevitably arise in the feedback circuit 26 and as a result of vibrations unconnected with the laser operation being picked up by the microphone 24. Spurious vibrations can be excluded by means of a second microphone 24A located to detect these vibrations but not to detect the pressure wave from the absorption process in the region 22. That is, the microphone 24A would be mechanically coupled to the microphone 24 but not mounted in the enclosure 12. By subtracting the output of the second microphone 24A from the output of the microphone 24, the signal which truly represents the absorption process is produced. The subtraction is performed at 25, within the feedback means 26.

Undesirable acoustic disturbance of the microphone 24 is also minimised by the arrangement shown in the diagram, in which the ac modulation is used to move the grating 30, which is outside the enclosure, and so is optically coupled but acoustically decoupled from the enclosure 12.

The microphone 24 may be of the diaphragm type. In view of the pressure levels to be experienced, the microphone will be delicate and care is required to ensure that repeated pressure increases and reductions do not damage the diaphragm. Possible damage can be reduced, it is believed, by exposing both faces of the diaphragm to the gas so that the diaphragm quickly relaxes after flexing in response to a pressure wave.

The arrangement described above has been found to provide a feedback signal with a signal-to-noise ratio which is an improvement over the optogalvanic methods. This permits the use of a shorter time constant for signal detection and operation of the piezo crystal 40 for frequency control, and thus a longer coherence length. The improved signal-to-noise ratio also allows a reduction in the amplitude of the dither used. This results in a reduction in the width of the frequency spectrum of the output radiation 18.

The gas within the laser may be substantially pure, such as carbon dioxide used to operate in the frequency range 9-11 $\mu$m. When pure gas is used, the process within the region 22 is one of self-absorption, i.e. absorption by the same gas which generates the radiation. In an alternative arrangement, traces of another gas may be introduced into the cavity 12, the trace gas having a strong absorption line which coincides with the laser frequency. Since such absorptions will begin from the ground level of the trace gas, rather than an excited state of the laser gas, the absorption is stronger and a high signal-to-noise level can be obtained by the use of only small amounts of trace gas. Traces of ethylene, ammonia, sulphur hexafluoride or osmium tetroxide are proposed for use with a carbon dioxide laser gas, because each of these trace gases has one or more resonance coinciding with a laser resonance of carbon dioxide.

Other laser gases proposed for use in the invention include carbon monoxide (CO) and nitrous oxide ($N_2O$) operating in the spectral region of 5–11 $\mu$m. These gases can be used in a laser at a power level of several watts which, although significantly lower than the 40 watt level referred to above for carbon dioxide, is expected to be sufficiently high to provide adequate performance of the optoacoustic system described.

It will be understood from the above that the optoacoustic method can, in principle, be applied to frequency stabilization of waveguide lasers, and especially radio-frequency-excited lasers, including radio frequency carbon dioxide lasers. Problems of radio frequency discharge noise normally associated with these lasers is greatly reduced when the above technique is used, because there is no electrical connection between the laser region 20 and the microphone.

Frequency stabilization could be achieved by using a Stark cell within the plasma free region 22 of the enclosure 12. This would modulate the optoacoustic absorption within the cell by frequency shifts (or line broadening) of the absorbing resonance. This modulates the output intensity but not the laser frequency. This technique can be used as an alternative to the laser frequency modulation described above.

The operation of the feedback circuit can be modified to operate by detecting a second derivative or second harmonic of the ac modulation frequency. This allows detection at frequencies well away from the carbon dioxide laser frequency centre, without requiring electronically generated offsets which could introduce signal drifts and noise.

We claim:

1. A gas laser comprising a gas-filled enclosure and excitation means operable to excite said gas within said enclosure to emit laser radiation, said excitation means exciting a plasma in a first region of said enclosure, and said enclosure having a second substantially plasma-free region, said laser further comprising pressure sensing means located in said second region, said pressure sensing means detecting pressure changes associated with absorption of laser radiation by said gas within said second region, said laser further comprising feedback means operative in response to the output of said pressure sensing means to control the frequency of said emitted laser radiation.

2. A laser according to claim 1, wherein the pressure sensing means is a microphone.

3. A laser according to claim 2, and wherein said microphone comprises a diaphragm, said diaphragm flexing in response to changes in pressure within said enclosure, and said diaphragm being exposed to said gas in said enclosure on both faces of said diaphragm, whereby damage to said diaphragm during use is averted.

4. A laser according to claim 1, and further comprising vibration sensing means responsive to vibrations generated within or outside said enclosure independently of absorption of radiation within said second region, said feedback means being responsive to signals from said vibration sensing means to subtract from the output of said pressure sensing means that part of said output which is caused by said vibrations.

5. A laser according to claim 4, wherein said vibration sensing means comprises a second microphone.

6. A laser according to claim 1, wherein said laser further comprises two reflecting means defining a path for laser radiation within said laser, said feedback means comprising means operable to change the relative positions of said reflecting means to change the length of said path.

7. A laser according to claim 6, further comprising a piezo crystal, one of said reflecting means being mounted on said piezo crystal, said piezo crystal receiving a signal from said feedback means.

8. A laser according to claim 6, wherein said path length is controlled by moving one of said reflecting means, said movable reflecting means being acoustically decoupled from said gas within said enclosure.

9. A laser according to claim 1, wherein said second region comprises a Stark cell, and said laser further comprises means for modulating the absorption frequency or line width of gas within said Stark cell.

10. A laser according to claim 1, wherein said feedback means comprises amplifying means, said amplifying means amplify the output of said pressure sensing means and generating a signal for use in controlling the laser frequency.

11. A laser according to claim 10, wherein said amplifying means provides a dc control signal.

12. A laser according to claim 10, wherein said feedback means provides an ac modulation signal by means of which said laser frequency is continuously varied.

13. A laser according to claim 10, wherein said amplifying means provides a dc control signal and said feedback means provides an ac modulation signal, and wherein said feedback means combines said ac modulation signal and said dc control signal before using said signals to control said laser frequency.

14. A laser according to claim 1, wherein said gas within said cavity comprises a trace gas in addition to said laser gas, said trace gas being absorbent to laser radiation produced by the laser gas.

15. A laser according to claim 14, wherein said trace gas has an absorption line which starts from the ground state of said trace gas and which is substantially coincident with said laser radiation frequency.

16. A laser according to claim 14, wherein said trace gas comprises ethylene, sulphur hexafluroride, ammonia or osmium tetroxide etc.

17. A laser according to claim 1, wherein said laser medium is carbon dioxide.

18. A laser according to claim 1, wherein said laser radiation frequency is in the infrared region.

19. In a gas laser comprising a gas-filled enclosure and excitation means operable to excite said gas within said enclosure to emit laser radiation, the improvement comprising locating said excitation means to excite a plasma in a first region of said enclosure to remain unexcited, said regions being in open communication with each other, and locating pressure-sensing means in said second region, the improvement further comprising means operable to receive the output of said pressure-sensing means and to use said output to control the frequency of said emitted laser radiation.

* * * * *